United States Patent [19]
Nehushtan et al.

[11] 3,939,359
[45] Feb. 17, 1976

[54] BATTERY CHARGING AND DISCHARGING SYSTEM

[75] Inventors: Jacob Nehushtan; Meyer Schusberger, both of Rishon-le-Zion, Israel

[73] Assignee: Tadiran Israel Electronics Industries Ltd., Israel

[22] Filed: Aug. 16, 1974

[21] Appl. No.: 497,888

[52] U.S. Cl. .......................................... 307/66
[51] Int. Cl.² ......................................... H02J 7/00
[58] Field of Search .......... 317/5; 307/10 BP, 66, 64

[56] References Cited
UNITED STATES PATENTS

| | | |
|---|---|---|
| 3,419,779 | 12/1968 | Zehner .................................. 307/66 |
| 3,684,891 | 8/1972 | Sieron ................................... 307/66 |
| 3,778,634 | 12/1973 | Hanrihan .............................. 307/66 |
| 3,784,892 | 1/1974 | Zeling ................................... 307/66 |

Primary Examiner—Herman J. Hohauser

[57] ABSTRACT

A battery charging and discharging system includes a charging circuit for charging a battery from supply mains and a first switching circuit responsive to a failure of the supply mains for switching the battery from the charging circuit to a discharge circuit which imposes a load thereon. A second switching circuit is thereafter responsive to the output of the battery to disconnect the load from the battery when the battery output falls below a predetermined level.

3 Claims, 3 Drawing Figures

BATTERY CHARGING AND DISCHARGING SYSTEM

The present invention relates to battery charging and discharging systems. The invention is particularly useful with respect to battery-operated lighting systems, and is therefore described below for purposes of example with respect to that application.

Rechargable batteries are commonly used for emergency lighting systems to automatically energize the lighting system upon the occurrence of a failure or interruption in the supply mains. The system commonly includes a charging circuit for charging the battery through the supply mains, a discharging circuit discharging the battery by energizing the electrical lighting system therefrom, and a switching circuit responsive to a failure in the supply mains for switching the battery from the charging circuit to the discharging circuit so that the lighting system is energized by the battery. It has been found, however, that particularly when nickle-cadmiun batteries are used, if the battery voltage during its energization of the lighting system drops below a predetermined low value, a polarity reversal of one of the cells may occur and the battery cannot be recharged by the normal charging current, but requires a much higher charging voltage than provided by the supply mains. Thus, it can easily happen that the battery in such an emergency lighting system may fail to recharge, which requires it to be removed from the system and recharged in a special device providing a charging voltage much higher than that provided by the charging circuit. This not only increases the maintenance costs of such a system, but also can result in a failure of the emergency lighting system when needed.

The present invention provides a battery charging and discharging system which cures the above drawback.

According to a broad aspect of the present invention, there is provided a battery charging and discharging system, comprising: a charging circuit charging the battery through the supply mains, a discharging circuit discharging the battery by energizing an electrical load device therefrom, and a switching circuit responsive to failure or interruption in the supply mains for switching the battery from the charging circuit to the discharging circuit so that the load is energized from the battery, characterized in that said discharging circuit includes a control circuit sensing the battery voltage during the discharge thereof through the electrical load device and interrupting the discharging circuit when the battery voltage drops to a pre-determined low value to prevent the further discharge of the battery.

According to a further feature, the control circuit includes a current-responsive device and a resistor in series therewith, said device and resistor being connected across the discharging circuit such that when the current through the current-responsive device drops below the predetermined low value as predetermined by the resistor, the device interrupts the discharging circuit.

In the preferred embodiments described below, the current-responsive device is a relay having a coil in series with the resistor, and a moveable contactor in the discharging circuit connecting the battery to the electrical load device.

Two embodiments of the invention are described below. In one embodiment, the load device is a lighting system which is automatically energized by the battery in response to the failure of the supply mains, the lighting system being automatically disconnected from the battery in response to the drop of the battery voltage to the pre-determined low value.

In the second described embodiment, there is included a presettable device enabling the system to be pre-set to operate according to at least two different modes, one mode being an automatic mode and effecting the automatic energization of the load by the battery in response to the failure of the supply mains and also effecting the automatic disconnection of the load from the battery in response to the drop of the battery voltage to the pre-determined low value, the second mode being a non-automatic mode and effecting the said energization of the load by the battery only after a control member has been first manipulated.

Further features of the invention will be apparent from the description below.

The invention is herein described, by way of example only, with reference to the accompanying drawings, wherein.

Figure 1:
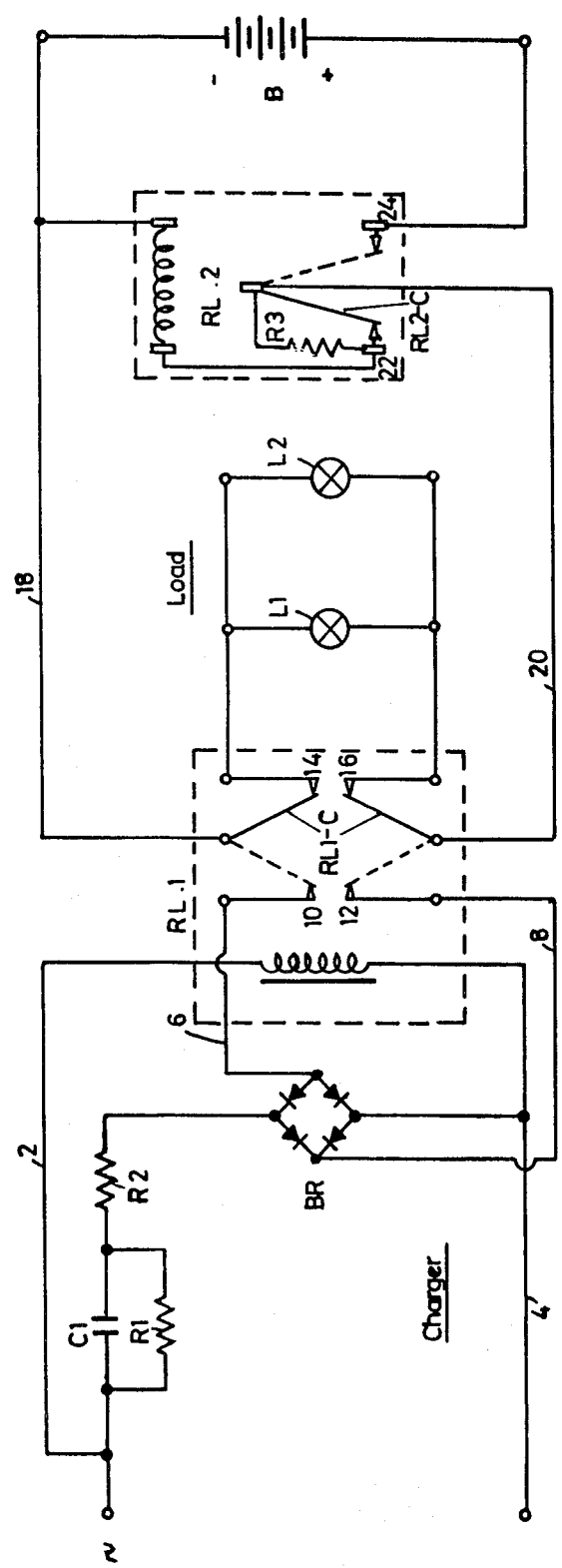
FIG. 1 is a circuit diagram illustrating one embodiment of the invention.

The FIG. 1 embodiment is a fixed emergency lighting system including lighting units L1, L2 which are automatically energized by the battery B in response to the failure or interruption of the supply mains 2, 4. During normal conditions when the supply mains are operating properly, the battery is continuously charged by the supply mains through the charging circuit. Upon failure of the supply mains, the battery is automatically connected to energize the load, and thus discharges through the load. As will be more particularly explained below, if the battery voltage drops to a predetermined low value while it is discharging through the load, the load is automatically disconnected from the battery to prevent the battery voltage from dropping further, which, if this occurred, might not enable the battery to be subsequently recharged from the supply mains.

More particularly, the circuit of FIG. 1 includes a relay RL1 whose coil is connected across the supply mains, the coil 5 of the relay having a pair of movable armatures or contractors RL1-C. The position of the contractors when the relay coil 5 is non-energized is shown in full lines in FIG. 1, and in broken lines when the relay coil is energized.

The battery-charging circuit 7 includes a bridge rectifier BR supplied from the mains via smoothing capacitor C1 and resistors R1, R2. The rectified output of bridge rectifier BR is applied via conductors 6, 8 to a pair of contacts 10, 12 which are engageable by relay contactors RL1-C when the relay is energized.

The electrical load devices, namely lighting units L1, L2, are connected to a second pair of electrical contacts 14, 16, which are engaged by the relay contactors RL1-C in the normal, non-energized condition of the relay.

One of the relay contactors RL1-C is connected via conductor 18 to the negative contact of battery B. The other relay contactor is connected via conductor 20 to the contactor RL2-C of a second ralay RL2. The coil of relay RL2 is connected in series with a resistor R3 across conductors 18, 20.

When relay RL2 is non-energized, its contactor RL2-C engages a contact 22 at the juncture of the coil of the relay and the resistor R3, as shown by the full-line position of the contactor in FIG. 1. When relay RL2 is energized, however, its contactor is moved to the broken-line position illustrated in FIG. 1, wherein it engages a contact 24 connected to the plus side of battery B.

The system of FIG. 1 operates as follows:

When the mains supply the normal voltage, relay RL1 is energized, and therefore its contactors RL1-C are in the broken-line positions illustrated in FIG. 1, engaging contacts 10, 12. It will also be noted that during this time that the supply mains are operating properly, relay RL1 is energized from the supply mains, via the circuit including conductors 6, 18, 20, and 8, this circuit also including the coil of relay RL2 and resistor R3 in series therewith. Thus, contactor RL2-C of relay RL2 will be in its actuated (broken-line) position in engagement with contact 24. In this condition battery B is being charged by the supply mains.

The battery B is thus continuously charged from the supply mains via conductors 6, 18 to one side of the battery, and conductors 8, 20 and contactor RL2-C to the other side of the battery.

Now should a failure occur in the supply mains, for example by an interruption or substantial drop in the supply voltage, relay RL1 will become deenergized, whereupon its contactors RL1-C will move to the illustrated full line positions, in engagement with contacts 14, 16 of the load circuit. One side of battery B is thus directly connected to one contact 14 of the load circuit. The other side of the battery is connected to the other contact 16 of the load circuit via contactor RL2-C, the latter being in its actuated (broken-line) condition, the relay now being energized by the battery. Thus, the battery B will energize the lighting units L1, L2, this circuit including the actuated condition of contactor RL2-C.

While the battery is discharging through the lighting units, the circuit senses when the battery voltage has dropped to a predetermined low value, and then interrupts the discharging circuit to the lighting units when this low value has been reached, to prevent the further discharge of the battery. This is accomplished by the coil of relay RL2 and resistor R3 connected in series therewith. The circuit including coil RL2 and resistor R3 is connected across the output terminals of battery B via contactor RL2-C in its actuated condition. Thus, when the output voltage of battery B drops below a predetermined value, which is predetermined by the value of resistor R3, there will be insufficient current through relay RL2 to maintain its contactor RL2-C in the actuated (broken-line) position, and the contactor will thereupon move from engagement with contact 24 into engagement with contact 22.

The discharging circuit of the battery B to the lighting units L1, L2 will thus be automatically interrupted when this predetermined low voltage is senses, to prevent the further discharge of the battery.

Figure 2:
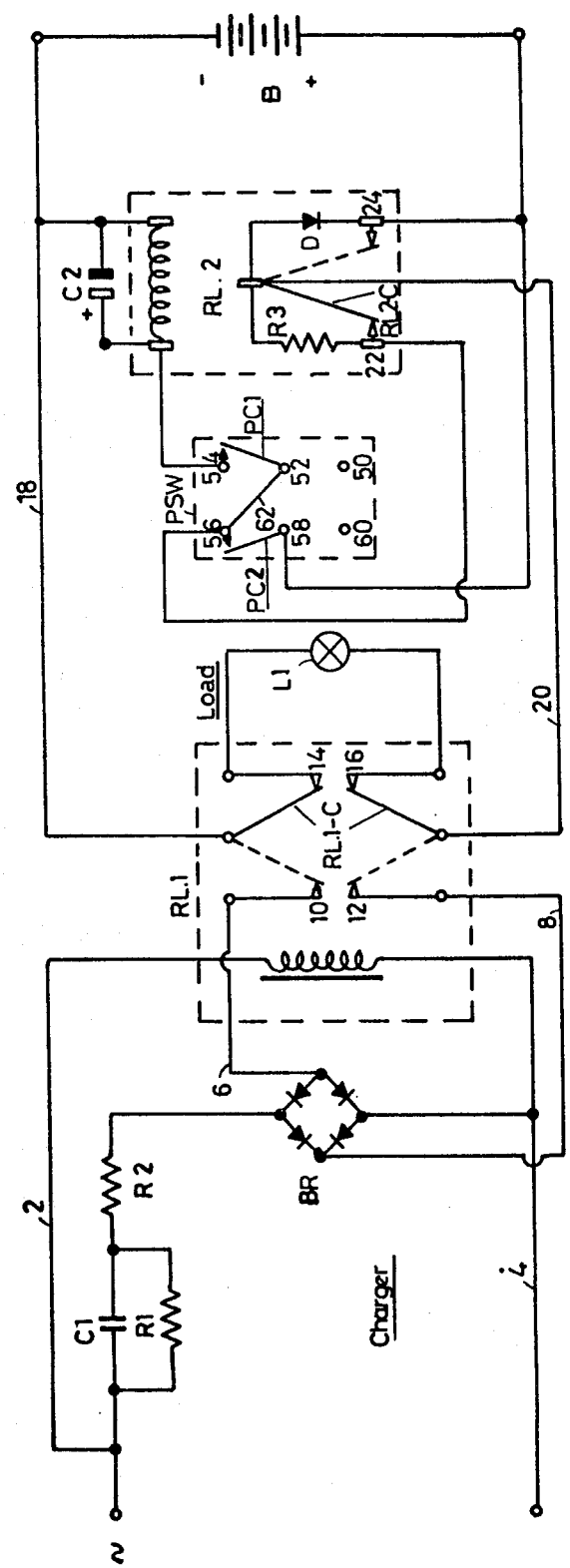
FIG. 2 is a circuit diagram illustrating a second embodiment of the invention.

FIG. 2 illustrates a system which may be preset to operate according to the automatic mode, as the system of FIG. 1, or according to a non-automatic mode. The specific mode is preselected by a presettable switch PSW, which has three positions. When set in the first position, the switch effects a non-automatic mode of operation, and when preset in the second position, it effects an automatic mode of operation, the automatic mode being exactly the same as in the FIG. 1 embodiment. The third position of the switch is a non-stable position wherein the switch automatically, when released, changes from the third position to the second position. The third position of the switch is used when it had originally been preset in the non-automatic mode (Position 1), and upon the interruption of the charging circuit from the supply mains it is desired to manually energize the load device (for example lighting units).

The system of FIG. 2 is particularly useful with portable lighting units, where the battery is to be continuously charged from the supply mains when the light unit is not used, but the light unit is to be energized by the battery only as and when specifically desired, i.e., not necessarily automatically as in FIG. 1. The FIG. 2 embodiment permits the non-automatic option by presetting the presettable switch PSW to its first position. The system also permits the automatic option, by presetting the switch to its second position, to enable the lighting units to be used as emergency lighting units which are automatically energized upon the interruption of the supply mains. In both options, the battery is protected from discharging below the predetermined low value, as in the system of FIG. 1.

More particularly, the FIG. 2 system including the means for sensing the interruption in the supply mains and for transferring the connections of the battery from the supply mains to the load device, operates in the same manner as in FIG. 1, and therefore the same reference numerals have been used for the same components. The main difference in the system of FIG. 2 over that of FIG. 1 is the inclusion of the presettable device, namely the three-position switch PSW, which determines whether the system will operate according to the automatic mode as in FIG. 1, or according to a non-automatic mode.

Figure 3:
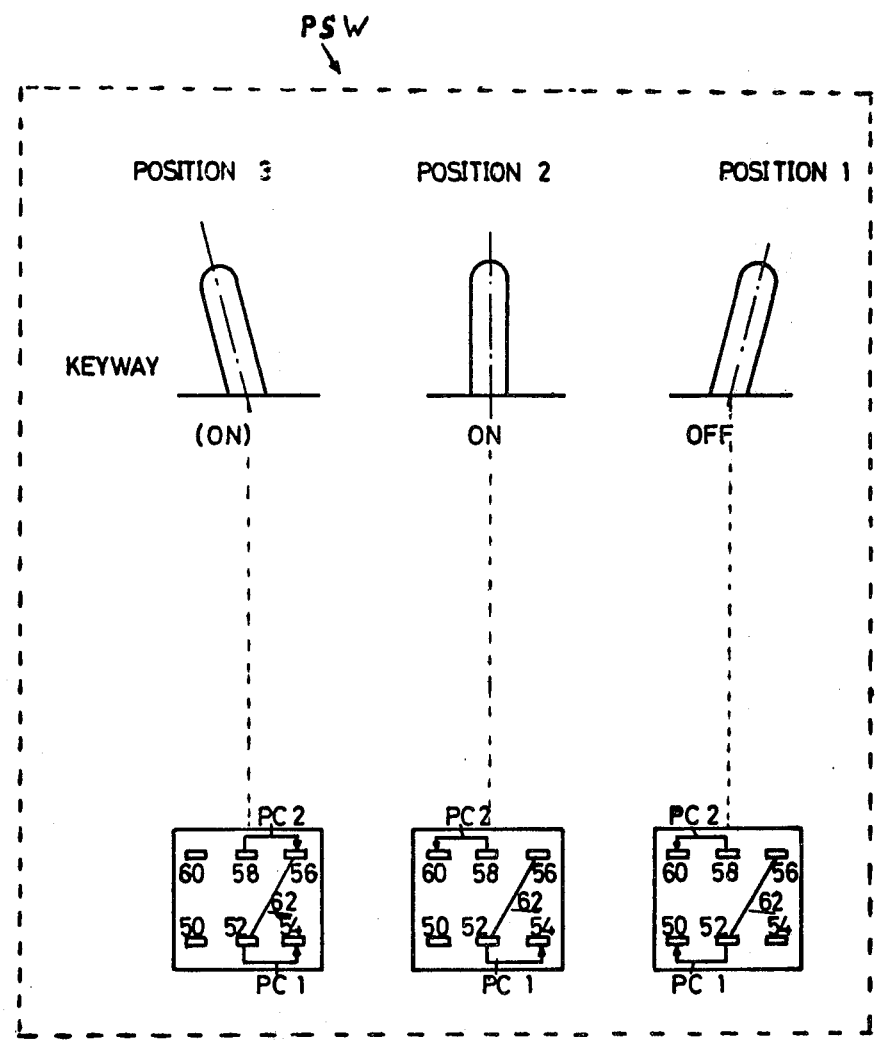
FIG. 3 illustrates the three-position presettable device included in the FIG. 2 embodiment.

As shown in FIG. 3, presettable switch PSW may be pivoted to one side (called Position 1) which effects a non-automatic mode of operation, or it may be pivoted to its middle position (Position 2) for effecting an automatic mode of operation. Both of the foregoing two positions are stable positions, that is, the switch will remain in that position even when released, until it is moved to another position. The switch can also be pivoted to its other side, Position 3. This is a non-stable position of the switch, which means that when the switch is released it will automatically return to the middle — Position 2.

Presettable switch PSW comprises a pair of movable contactors PC1 and PC2. Contactor PC1 is adapted to connect contacts 50 and 52 when the switch is set in Position 1, and contacts 52 and 54 when in either of Positions 2 and 3. Contactor PC2 is adapted to contact contacts 58 and 60 when in Position 1 or Position 2, and contacts 56 and 58 when in Position 3. Contacts 52 and 56 are constantly short-circuited, e.g. by conductor 62. (Actually, contacts 50 and 60 do not serve any useful function in the circuit of FIG. 2, and are merely illustrated since they exist in standard switches that are readily adaptable to be employed for the purposes in question).

The low-voltage detecting circuit in the FIG. 2 embodiment also includes relay coil RL2 having a movable contactor RL2-C, and a resistor R3, which determines the low-voltage point for disconnecting the battery from the load. In the FIG. 2 embodiment, however, relay coil RL2 is not connected directly to resistor R3, but rather is connected to the resistor R3 via contacts 54 and 56. In addition, the plus side of battery B is connected not only to contact 24, but also to contact 58 within the presettable switch PSW. Also, a diode D is connected between contactor RL2-C and contact 24.

The system of FIG. 2 operates as follows:

First, if automatic energization of the load device by battery B is desired upon interruption of the supply mains voltage, presettable switch PSW is set in its Position 2 middle position. In this position, contactor PC1 engages contact 54, but contactor PC2 is out of engagement with contact 56. The system of FIG. 2 will then operate exactly as the system of FIG. 1, as shown by the following explanation:

When power is being supplied by the mains, relay RL1 is energized, whereupon its contactors RL1-C are moved to their actuated positions in engagement with contacts 10, 12. In addition, relay RL2 is energized from the output of the bridge rectifier BR, this circuit including conductor 18, the coil of relay RL2, contactor PC1 of the presettable switch PSW, contact 56, contactor RL2-C of relay RL2, and contact 12 back to the other side of the rectifier. Thus, relay RL2 is energized, and its contactor RL2-C is moved to its actuated condition in engagement with contact 24. Battery B is thereby charged by the mains supply, the charging circuit including contactor RL2-C engaging contact 24, and thereby bypassing diode D.

When the power of the mains supply is interrupted or fails, relay RL2 remains energized directly from the battery B, this circuit including resistor R3 and contactor RL2-C engaging contact 24. However, relay RL1 become deenergized, whereupon its contactors RL1-C move to their full-line positions in FIG. 2, in engagement with contacts 14, 16. Thus, the battery is connected across the load L1 through a circuit including conductor 20 and contactor RL2-C in its actuated condition, in engagement with contact 24, while relay RL2 is retained energized by the circuit comprising resistor R3, and contacts 56, 52 and 54 of switch PSW which is set in Position 2. As described in the FIG. 1 embodiment, should the output voltage of battery B drop below the predetermined low value, as predetermined by resistor R3, relay RL2 will release its contactor RL2-C, whereupon the latter will move back to the full-line position of FIG. 2, out of engagement with contact 24, thereby interrupting the connection of the battery to the load device.

Thus, when the FIG. 2 system is preset in Position 2, it functions exactly as the FIG. 1 system, namely automatically connecting the load to the battery upon the interruption of the mains supply, and automatically disconnecting the load from the battery should the battery voltage drop below a predetermined value.

If non-automatic operation is desired, presettable switch PSW is preset in its Position 1. In this position, contactor PC1 is out of engagement with contact 64, and also contactor PC2 is out of engagement with contact 56.

In this non-automatic mode of operation of the system, when power is supplied by the supply mains, relay RL2 is not energized because its circuit is interrupted by the fact that contactor PC1 is out of engagement with contact 54. Accordingly, contactor RL2-C of relay RL2 will be in its non-actuated condition, namely the full-line condition illustrated in FIG. 2, out of engagement with contact 24. Nevertheless, the battery B is charged by the mains supply via conductor B, contact 12, contactor RL1-C, conductor 20, and diode D, all connected to one side of the battery, the opposite side of the battery being directly connected to the mains supply via conductors 6 and 18.

When the power of the mains supply is interrupted, relay RL1 becomes deenergized, returning its contactors RL1-C to their full-line positions in engagement with contacts 14, 16. However, battery B is not thereby connected across the load, because of the fact that contactor RL2-C is in its non-actuated (full-line) position, and therefore the circuit from the plus side of the battery through the load is interrupted by the diode D.

Thus, in this mode of operation, the load is not automatically connected to the battery upon the interruption of the mains power supply.

In order to connect the load to the battery, it is necessary to move switch PSW to its position 3, by pivoting same to the other side, whereupon its contactor PC2 connected contacts 56 and 58, and its contactor PC1 connectss contacts 52 and 54. As described earlier, Position 3 of the presettable switch is a non-stable position, and as soon as the switch is released, it automatically moves to Position 2 (the middle position) thereby interrupting the connection between contacts 56 and 58, but retaining the contact between contacts 52 and 54.

When the switch is in its temporary Position 3, relay RL2 is energized by battery B via both contactors PC1 and PC2, the latter connecting contact 58 to one side of the battery. Energization of relay RL2 causes its contactor RL2-C to move to the broken-line position, in engagement with contact 24. Thus, when the switch is released, and it returns from Position 3 to Position 2, moving contactor PC2 out of engagement with contact 56, the energization of relay RL2 will still be maintained by contactor RL2-C engaging contact 24, via resistor R3, and contactor PC1 of the presettable switch.

The load device L1 is connected across the battery via contactor RL2-C in its actuated condition. While the battery is discharging through the load, the circuit including relay RL2 and resistor R3 detects the battery voltage so that when it drops below a predetermined value, relay RL2 will not draw sufficient current to maintain its contactor RL2-C in its actuated condition engaging contact 24. When this occurs, contactor RL2-C will move to its full-line position, thereby interrupting the connection of the battery to the load, and so preventing a further discharge of the battery, all in the same manner as described in conjunction with FIG. 1.

Capacitor C2 is included across relay coil RL2 to peak the current through the relay when presettable switch PSW is moved to its Position 3. An indicator may also be provided across the load to indicate when the load is drawing current from the battery.

While the invention has been described above particularly with respect to controlling lighting systems, it will be appreciated that it could be used for other types of electrical load devices, for example motors or the like. Further, while electromechanical relays are illustrated, solid-state switches or relays could be used. Many other variations, modifications and applications of the illustrated embodiments will be apparent.

What is claimed is:

1. A battery charging and discharging system for normally supplying power from an alternate current source as charging power to a battery, for disconnecting the battery from the source and connecting the battery to a load when said source power fails and the battery current exceeds a preselected value, and to disconnect the battery both from source and from said load when said source power fails and the battery current fails to said value, said system comprising:
- a first pair of terminals adapted for connection to said source;
- a second pair of terminals adapted for connection to said load;
- a third pair of terminals adapted for connection to the battery;
- fourth and fifth pairs of terminals, one of the fifth pair of terminals being connected to one of the third pair of terminals;
- a device connected between the interconnected terminals of the third and fifth pairs and the others of said third and fifth pair terminals to interconnect the said other terminals and supply charging current to said battery when charging current is supplied to the fifth pair of terminals, to interconnect the said other terminals and cause the battery to supply current to said fifth pair of terminals when said charging current is absent and said battery current exceeds said value, and to disconnect said other terminals from each other and prevent battery current from being supplied to said fifth pair of terminals when charging current is absent from the fifth pair of terminals and said battery current is absent; and
- a battery charging circuit connected between said first and fourth pairs of terminals, said circuit including a first relay having a winding which is energized when said source supplies power and deenergized when source power fails, said first relay having first contact means connecting said fifth pair of terminals to said second pair of terminals when said winding is deenergized and connecting said fifth pair of terminals to said fourth pair of terminals when said winding is energized, said circuit delivering charging current to said fourth pair of terminals when said relay is energized.

2. The system as set forth in claim 1 wherein said device includes a second relay having a winding and second contact means, said second relay winding being energized when charging current is supplied to the fifth pair of terminals and when the battery current exceeds said value and the charging current is absent, said second relay winding being deenergized when charging current is absent and the battery current fails to said value, said second contact means interconnecting the other third pair terminal to the other fifth pair terminal when the second relay winding is energized and disconnecting the other pair terminal from the other fifth pair terminal when the second relay winding is deenergized.

3. The system as set forth in claim 2 wherein said device includes a resistance which is connected in series with the second relay winding when the other third pair terminal is connected to the other fifth pair terminal and which is short circuited when the other third pair terminal is disconnected from the other fifth pair terminal.

* * * * *